United States Patent
Paschke

(10) Patent No.: US 11,399,923 B2
(45) Date of Patent: Aug. 2, 2022

(54) ULTRASONIC DENTAL INSTRUMENTS, INSERT ASSEMBLIES, AND INSERTS WITH IMPROVED PERFORMANCE DURABILITY

(71) Applicant: Paschke Ultrasonics, LLC, Missoula, MT (US)

(72) Inventor: Richard H. Paschke, Missoula, MT (US)

(73) Assignee: PASCHKE ULTRASONICS, LLC, Missoula, MT (US)

( * ) Notice: Subject to any disclaimer, the term of this patent is extended or adjusted under 35 U.S.C. 154(b) by 0 days.

(21) Appl. No.: 17/226,779

(22) Filed: Apr. 9, 2021

(65) Prior Publication Data

US 2021/0315674 A1     Oct. 14, 2021

Related U.S. Application Data

(60) Provisional application No. 63/008,041, filed on Apr. 10, 2020.

(51) Int. Cl.
| | | |
|---|---|---|
| *A61C 17/20* | (2006.01) | |
| *A61C 1/07* | (2006.01) | |
| *B06B 1/06* | (2006.01) | |
| *B06B 1/08* | (2006.01) | |

(52) U.S. Cl.
CPC ............... *A61C 17/20* (2013.01); *A61C 1/07* (2013.01); *B06B 1/06* (2013.01); *B06B 1/08* (2013.01)

(58) Field of Classification Search
CPC .. A61C 17/20; A61C 1/07; B06B 1/06; B06B 1/08
See application file for complete search history.

(56) References Cited

U.S. PATENT DOCUMENTS

| | | | |
|---|---|---|---|
| 3,075,288 A | 1/1963 | Balamuth et al. | |
| 3,076,904 A | 2/1963 | Kleesattel et al. | |
| 3,930,713 A | 1/1976 | Stankewitz et al. | |
| 4,169,984 A * | 10/1979 | Parisi | A61C 17/20 310/323.18 |
| 4,371,816 A | 2/1983 | Wieser | |
| 10,368,967 B2 | 8/2019 | Swatton et al. | |

FOREIGN PATENT DOCUMENTS

FR          3018041 A1     9/2015

OTHER PUBLICATIONS

International Search Report and Written Opinion issued in corresponding International Application No. PCT/US2021/026640 dated Jul. 22, 2021, 15 pages.

* cited by examiner

*Primary Examiner* — Heidi M Eide
*Assistant Examiner* — Drews S Folgmann
(74) *Attorney, Agent, or Firm* — Carter, DeLuca & Farrell LLP

(57) ABSTRACT

Ultrasonic dental instruments, inserts, and insert assemblies are provided which include an acoustic transformer and a tip that, in combination, are configured to operate at an operational frequency different from the frequency of resonance of the transducer that drives the combination. As a result, the ultrasonic dental instruments, inserts, and insert assemblies provide improved performance durability by providing improved output stroke ranges over nominal wear lengths between, for example, 2 mm and 3 mm, which results in more durable performance over a longer service life.

27 Claims, 7 Drawing Sheets

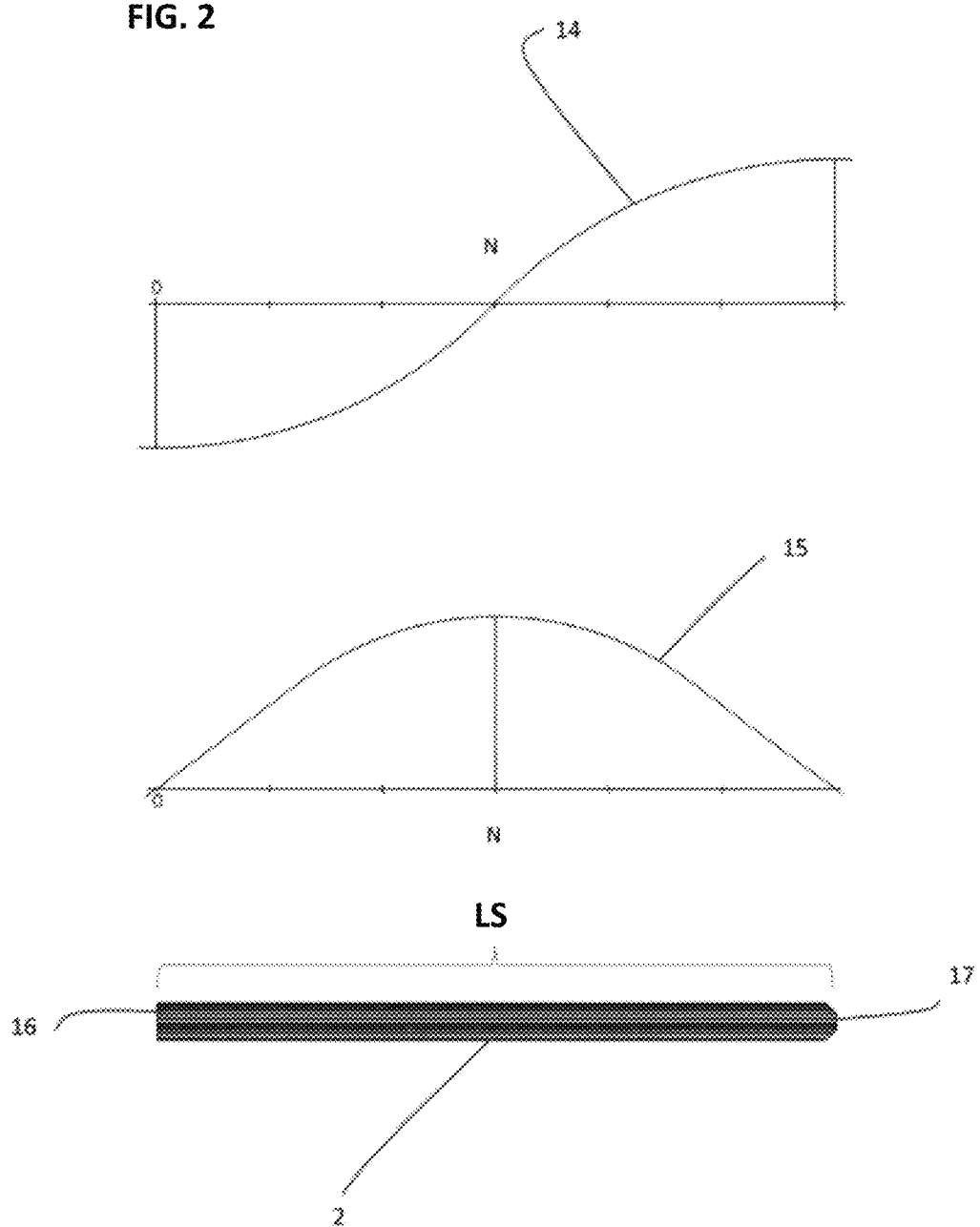

| Tip Wear | 36 a1=65 a2=10 | | 37 a1=60 a2=15 | | 38 a1=70 a2=10 | | 39 a1=70 a2=15 | |
|---|---|---|---|---|---|---|---|---|
| | % change | Gain | % change | Gain | % change | Gain | % change | Gain |
| 0.00 | 0 | 4.3 | 0 | 4.8 | 0 | 4.3 | 0 | 4.6 |
| 0.50 | 8.2% | 4.9 | 5.7% | 5.1 | 7.4% | 4.8 | 4.8% | 5.0 |
| 1.00 | 19.6% | 5.6 | 14.0% | 5.5 | 18.8% | 5.5 | 12.8% | 5.6 |
| 1.50 | 27.8% | 6.1 | 19.1% | 5.7 | 28.8% | 6.0 | 20.6% | 6.1 |
| 2.00 | 17.1% | 5.8 | 12.6% | 5.4 | 28.5% | 6.3 | 18.6% | 6.3 |
| 2.50 | 15.8% | 6.0 | 10.2% | 5.3 | 21.8% | 6.2 | 19.7% | 6.6 |
| 3.00 | -4.4% | 5.2 | -4.7% | 4.6 | 1.4% | 5.4 | 6.0% | 6.1 |
| 3.50 | -19.9% | 4.5 | -19.0% | 3.9 | -16.1% | 4.6 | -10.7% | 5.3 |
| 4.00 | -31.0% | 4.0 | -29.6% | 3.4 | -28.2% | 4.1 | -23.7% | 4.7 |

ULTRASONIC DENTAL INSTRUMENTS, INSERT ASSEMBLIES, AND INSERTS WITH IMPROVED PERFORMANCE DURABILITY

CROSS-REFERENCE TO RELATED APPLICATIONS

This application claims the benefit of, and priority to, U.S. Provisional Patent Application No. 63/008,041, filed on Apr. 10, 2020, the entire contents of which are hereby incorporated herein by reference.

FIELD

The present disclosure is generally related to dental systems and tools. More specifically, the present disclosure relates to dental ultrasonic instruments, insert assemblies, and inserts that are designed to facilitate improved output stroke over the normal wear life of the instruments, insert assemblies, and inserts.

BACKGROUND

The use of worn ultrasonic dental instruments is not recommended for several reasons. For example, the standard of care is compromised due to the reduced stroke of a worn tip portion of the insert when the tip portion is applied against a tooth during treatment. The stroke on conventional inserts decreases monotonically as the inserts wear. To compensate, the clinician generally needs to increase the power dial on the ultrasonic system and often needs to apply greater pressure against the tooth. Applying increased pressure against the tooth often subjects the clinician to increased pinch force and pain, which contributes to increased wrist strain and having to deviate from the neutral wrist position.

The decrease in output stroke as a result of tip portion wear also affects the efficiency of biofilm removal during treatment. Studies by Dr. J. W. Costerton and others highlight the importance of biofilm management in the medical and dental environments. Since many treatment modalities are performed at low power or stroke levels, reduction in these parameters due to wear further limits the clinician in removing and managing biofilms.

Physical durability of a dental instrument refers to the rate of wear of the tip portion of the instrument that is applied to a tooth structure during treatment. Some manufacturers have adopted the use of nano technology using TiN (titanium nitride) and others applied vapor deposition or alloying processes to increase the thickness of the alloy layers. This approach has shown increases in mechanical abrasion resistance of the parts for over a million cycles. Sufficient durability is achievable for some instruments such as, for example, with respect to hand scalers which can maintain sufficient sharpness over thousands of scaling movements. However, achieving sufficient durability with respect to ultrasonic dental instruments is more difficult, such as with respect to ultrasonic dental scaler systems operating in the 30 kHz frequency range which cycle over 1,800,000 times per minute (1.8 million cycles).

The performance durability of a dental instrument or component defines the ability of the instrument or component to maintain a high level of performance over a normal physical wear over many dental treatments. This ability of the instrument or component to substantially retain its original performance level over the life of the product is a superior predictor of durability.

Currently, the useful life of an ultrasonic insert is defined in terms of the output stroke or cleaning efficiency. With conventional ultrasonic inserts, there can be a decrease of about 25% or more in performance and/or efficiency after the tip portion wears only 1 mm, and a decrease of about 50% or more in performance and/or efficiency after 2 mm of wear. This 2 mm wear threshold has, in fact, been adopted by the industry as a de facto standard.

In a typical dental cleaning treatment or debridement, an ultrasonic system vibrates the attached insert at its frequency of resonance. This produces mechanical vibrations that can be varied in stroke (two times the amplitude) as determined by the treatment. The stroke in a typical treatment is in the range of 0.001 to 0.003 inches (1 to 3 mils).

For example, using 2 mills of stroke during treatment, a tip portion worn approximately 1 mm will have a reduced stroke of 1.5 mils or 25%. To compensate, the clinician will typically increase the power setting. The power scales on ultrasonic equipment are not calibrated for and do not even display settings in stroke. As a result, clinicians are essentially increasing the power dial with the assumption the stroke is increasing. In some cases, the ultrasonic system is not capable of increasing the output stroke enough to compensate for the loss in efficiency. The only other option at the clinician's disposal is to use more pressure, which can cause patient harm and/or discomfort. Of course, in the case of a 2 mm wear, the issues are compounded even further.

Ultrasonically activated inserts were introduced in the late 1950's. These designs involved removing scaling tips from metal dental hand instruments and brazing them onto nickel stacks which produced mechanical motion and energy when activated by an electronic system tuned to the frequency of resonance of the ultrasonic instrument. These early systems demonstrated a fast and efficient means to remove hard tartar (dental calculus) from patients' teeth. U.S. Pat. No. 3,075,288 to Balamuth et al., U.S. Pat. No. 3,076,904 to Kleesattel et al., and U.S. Pat. No. 10,368,967 to Swatton et al., for example, demonstrate the use of half-lambda magnetostrictive drivers and half-lambda acoustic transformers operating at their frequencies of resonance. In U.S. Pat. No. 3,930,713 to Banco ("Banco"), the physics of resonance and mechanical principles are described, including the relationship between amplitude and force as applied to the design of ultrasonic dental inserts.

Modern ultrasonic dental systems have improved on the activation and control of the ultrasonic tools but the design principles for the inserts remain substantially the same.

Acoustic transformers function to couple and amplify the mechanical vibration generated by the magnetostrictive or piezoelectric transducers. They can be fully analyzed by several mathematical methods including, frequencies of resonance, force and stress distribution curves, impedance, and amplitude distribution curves and, therefore, the magnification ratio and the position of the nodes. The relationship of force, amplitude, and impedance for a half lambda ($\lambda/2$) section of an acoustic transformer operating at its frequency of resonance, as disclosed in Banco, is characterized by amplitude maxima at both ends wherein the forces at the ends are equal to zero. The force and velocity at any section on the acoustic transformer can be express by:

$$F_j = F_i \cos\alpha_j \pm Z_j V_i \sin\alpha_j \text{ and } V_j = V_i \cos\alpha_j \mp \frac{1}{Z_j} F_i \sin\alpha_j$$

-continued where $\alpha_i = 2\pi \frac{L_i}{\lambda}$, $V_i = \omega A_i$, $Z_i = (\rho C_L)_i S_i$, A=amplitude, S=CS area, and $C_L$=longitudinal sound velocity of material.

The above concept can be expanded to include two half wavelength ($\lambda/2$) sections. Using a magnetostrictive system, for example, one section includes a stack of magnetostrictive laminations while the second section comprises an acoustic transformer. At resonance, the force at both free ends and the junction of the $\lambda/2$ sections will be zero and the amplitudes will be maxima at the free ends.

This design standard for prior art dental inserts uses the physical principles described in Banco. When the length of the dental insert tip is less than $\lambda/4$, a portion of a length of a distal end portion of a resonant acoustic transformer can be replaced with an equivalent mass represented by the tip.

At resonance, the sum of the impedance of a left and right section of the acoustic transformer cut at an arbitrary point 'x' is equal to zero. This can be described mathematically by the formula $Z_L + Z_R = 0$. This is a condition of resonance, wherein the impedance of the left section is equal to the negative value of the impedance of the right section. For a cylindrical resonator, one-half wavelength long, we can cut, for example, a section $x = \lambda/8$ measured from the left end, wherein the two impedance terms are expressed as:

$$Z_L = \rho v S \left( \tan \frac{\pi}{4} \right) = \rho v S \text{ and } Z_R = \rho v S \left( \tan \frac{3\pi}{4} \right) = -\rho v S$$

Applying the same computing principles, the characteristics or pattern of force and velocity can be found off resonance.

French Patent No. 3018041B1 to Gigault, introduced the concept of using a distal groove with a varying depth on a rectilinear tool to keep the area of the tip portion constant as the tip portion wears with the intention of controlling the output stroke during tip wear. The physical and mechanical requirements for this design approach, however, limit its application for any non-rectilinear designs with small cross-sections areas due to the potential for excessive flexural modes and additional stress risers due to slots at or near the tip portion of the insert.

SUMMARY

The present disclosure overcomes the limitations of the prior art and provides ultrasonic dental inserts with improved performance durability. The improved durability enables the ultrasonic dental inserts of the present disclosure to provide improved output stroke ranges over their nominal wear lengths, which results in a more durable performance and a longer service life. More specifically, non-limiting examples are provided, wherein the design parameters are selected to create a controlled increase in output amplitude over the first 1 mm of tip portion wear and then decrease as the tip portion continues to wear, for example, to 2 mm and beyond. Aspects and features herein described improve the performance of the inserts over a nominal 2 mm or greater wear.

The present disclosure, in aspects, takes into consideration the effect of deceasing output stroke due to impedance changes as the tip portion wears by initial operation off-resonance and selection of acoustic designs that create increasing tip-acoustic transformer gains as the tip portion wears over the insert's operational life.

The present disclosure also provides previously unexpected benefits for the clinician, including the characteristic of increasing output stroke as the tip portion wears over the initial service life.

In aspects, the acoustic transformer, including the tip, referred to as a connecting body tip assembly (CBTA), is configured to operate at a frequency substantially lower than the frequency of resonance of the magnetostrictive stack which is mechanically coupled to the CBTA. The tip may be connected to the acoustic transformer by various means, for example, press fit, threads, brazed, machined as a single piece, or in any other suitable manner.

The acoustic gains provided in accordance with the present disclosure vary with the frequency parameter, as demonstrated in the FEA analysis, which in part provides the enhanced performance characteristics.

In further aspects, the contra bend of the tip portion of the CBTA in combination with the distal bend angle, the length of the terminal portion of the tip portion, and the bend radii, are configured to control the range of the output stroke over the operating range of the dental instrument.

The present disclosure, more specifically, provides, in aspects, a dental ultrasonic insert assembly including a transducer defining a frequency of resonance of the transducer, an acoustic transformer, and tip coupled to a distal portion of the acoustic transformer. A mesial portion of a combination of the acoustic transformer and the tip is coupled to the transducer, and an operational frequency of the combination is not equal to (e.g., is greater than or less than) the frequency of resonance of the transducer. At a full length L of the tip, a force at a junction of the transducer and the acoustic transformer is finite. At a reduced length L−X, wherein X represents an amount of wear of the tip, the force at a junction of the transducer and the acoustic transformer is substantially zero and an output stroke of the tip is substantially at a maximum.

In aspects of the present disclosure, the operational frequency at the reduced length L−X is coincident with the frequency of resonance.

In aspects of the present disclosure, X is greater than 1 mm. In aspects, X is greater than 0 mm and less than 4 mm.

In aspects of the present disclosure, the operational frequency is between 18 kHz and 50 kHz.

In aspects of the present disclosure, the tip is press fitted onto the acoustic transformer or an integral part of the acoustic transformer. In aspects, the tip is removable, via threaded engagement, from the acoustic transformer.

In aspects of the present disclosure, the transducer is piezoelectric or magnetostrictive.

Another dental ultrasonic insert assembly provided in accordance with the present disclosure includes a transducer having a frequency of resonance and defining a length substantially equal to one-half wavelength of the frequency of resonance, an acoustic transformer, a tip extending distally from the acoustic transformer. A combination of the acoustic transformer and the tip is configured to operate at an operational frequency below the frequency of resonance, the combination defines a length greater than one-half wavelength of the frequency of the transducer, and the operational frequency of the combination approaches the frequency of resonance as a length of the tip is reduced from a full length. The dental ultrasonic insert assembly may further be configured similar to any of the aspects above or otherwise detailed herein.

Still another dental ultrasonic insert assembly provided in accordance with the present disclosure includes a transducer defining a length substantially equal to one-half wavelength of a frequency of resonance thereof, and a combination of a tip and an acoustic transformer. The combination defines a length greater than one-half wavelength of the frequency of the transducer and is configured to operate at an operational frequency below the frequency of resonance. The combination has a non-monotonic stroke value that includes a maxima as the length of the tip is reduced, and the operational frequency of the combination approaches the frequency of resonance as the length of the tip is reduced. The dental ultrasonic insert assembly may further be configured similar to any of the aspects above or otherwise detailed herein.

Yet another dental ultrasonic insert assembly provided in accordance with the present disclosure includes a transducer defining a length substantially equal to one-half wavelength of a frequency of resonance thereof, and a combination of a tip and an acoustic transformer. The combination is configured to operate at an operational frequency below the frequency of resonance and defines a length greater than one-half wavelength of the frequency of resonance. The tip has a bend radius where a ratio of a distance from a distal point of the tip to tangency with the bend radius is greater than 1.25. The tip further defines two angles where a ratio of a more-proximal of the two angles to a more-distal of the two angles is greater than 3. The dental ultrasonic insert assembly may further be configured similar to any of the aspects above or otherwise detailed herein.

In aspects of the present disclosure, the ratio of the distance is greater than 1.25 and less than 2.25.

In aspects, the ratio of the distance is such that an output stroke remains within 25% of an initial output stroke over a reduction in a length of the tip of at least 2.0 mm or, in aspects, of at least 3.0 mm.

In aspects, the ratio of the more-proximal angle to the more-distal angle is such that an output stroke remains within 25% of an initial output stroke over a reduction in a length of the tip of at least 2.0 mm or, in aspects, of at least 3.0 mm.

In aspects, the ratio of the more-proximal angle to the more-distal angle in combination with the ratio of the distance are such that an output stroke remains within 25% of an initial output stroke over a reduction in a length of the tip of at least 2.0 or, in aspects, of at least 3.0 mm.

Additional aspects and features of the present disclosure will be apparent from the description and drawings, and from the claims. To the extent consistent, any of the aspects and features detailed herein may be used with any or all of the other aspects and features detailed herein.

BRIEF DESCRIPTION OF THE DRAWINGS

FIG. 2 is a side view of a magnetostrictive stack including curves depicting the relationship between the velocity and force along the length of the stack at a frequency of resonance;

DETAILED DESCRIPTION

Aspects and features of the present disclosure are described herein with reference to the accompanying drawings. In the following descriptions, well known functions or constructions are summarily described or omitted entirely to avoid obscuring the present disclosure in unnecessary detail. The terms insert, insert tip, and tip are used interchangeably herein, while the term tip portion refers to a distal end portion of the insert, insert tip, or tip. In addition, the terms insert assembly, tip assembly, or insert tip assembly are used interchangeably and include, in addition to the insert, insert tip, or tip, one or more additional components (whether monolithically formed or otherwise directly or indirectly coupled with the insert, insert tip, or tip), thus forming an assembly. The assembly may itself be or may be connectable to a tool or instrument, which terms are used interchangeably as well. Further, although the aspects and features of the present disclosure are described herein, by way of example, with respect to magnetostrictive systems, it is understood that the aspects and features of the present disclosure also apply equally to piezoelectric systems.

Figure 1:
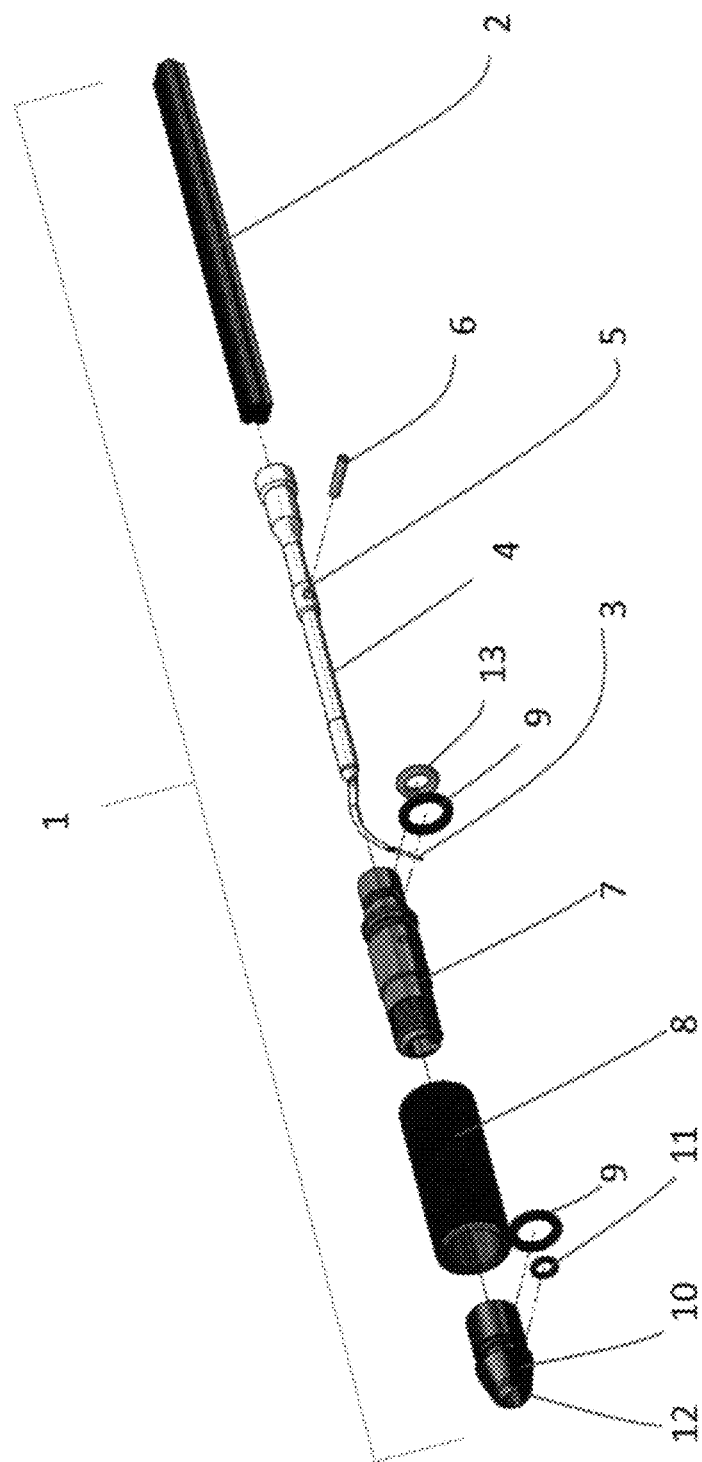
FIG. 1 is an exploded, perspective view of a magnetostrictive ultrasonic insert assembly in accordance with the present disclosure.

Referring to FIG. 1, a dental ultrasonic insert 1 is configured to connect to a magnetostrictive transducer 2 to drive a free end portion (e.g., the tip portion) of the insert tip 3, at ultrasonic frequencies to facilitate treating a patient's teeth. The transducer 2 may operate in a frequency range of, for example, from 18 kHz to 50 kHz. Magnetostrictive stack assemblies (transducers), such as transducer 2, used in dental devices are unilaterally loaded, therefore, the mass of the transducer is crucial for the transmission of acoustic power. The equivalent in a piezoelectric system would be referred to as a loading mass that is used to compress the crystals (not shown). This asymmetric action by the transducer 2 is referred to as initial drive.

With continued reference to FIG. 1, the mass of the combination of the transducer 2, and combination of the acoustic transformer 4 (also referred to herein as a connecting body tip assembly (CBTA) 4) and tip 3, are supported in a nodal area 5, with nodal pin 6, captured by support sleeve 7. A grip 8 is coupled via a resilient member 9, e.g., an O-ring, to support sleeve 7. Assembly of the insert assembly 1 is completed with attachment of nose cone 10, where a resilient member 11, e.g., an O-ring, prevents fluid exit on the circumference of the exit port 12 on nose cone 10. Assembling the insert assembly 1 to a dental handpiece (not shown) is performed via insertion of support sleeve 7 into the dental handpiece, wherein a resilient member 13, e.g., an O-ring, mounted about support sleeve 7 provides a fluid seal between the insert assembly 1 and the dental handpiece while enabling 360-degree rotation of the mounted insert assembly 1.

With reference to FIG. 2, transducer 2 is shown as a stack assembly consisting of several Permanickel laminations. Transducer 2 is activated at its frequency of resonance, which is determined by its length (LS). Under these conditions, a force 15, is equal to zero at both ends 16 and 17. The velocity 14 is zero at the node N and has its maxima at both ends 16 and 17.

Figure 3A:
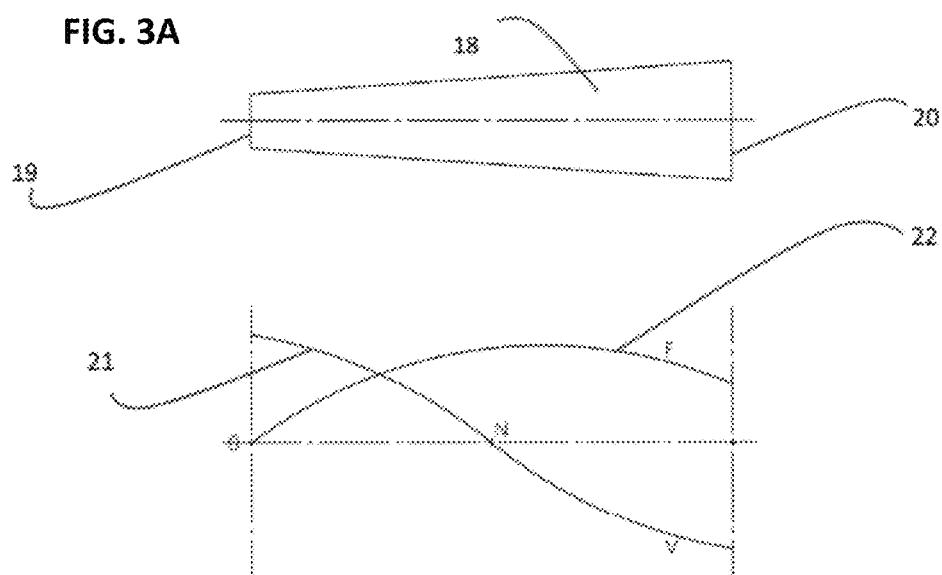
FIG. 3A is a side view of a tapered acoustic transformer including curves depicting the relationship between velocity and force along its length where the frequency of operation is less than the frequency of resonance.

With reference to FIG. 3A, in aspects, a tapered acoustic transformer 18 is provided wherein the force 22 is finite, for example, greater than zero at the mesial end 20 of the acoustic transformer 18, and has a zero value at the distal end 19. The velocity 21 is a relative maxima at the distal end 19 of the acoustic transformer 18 and will become a maxima as the length of the acoustic transformer 18 approaches its half wavelength value (see FIG. 5B, as described hereinbelow). In such aspects, the magnification ratio and the nodal point are determined by the various configurations herein described and are different from values, for example, of a resonant section.

Figure 3B:
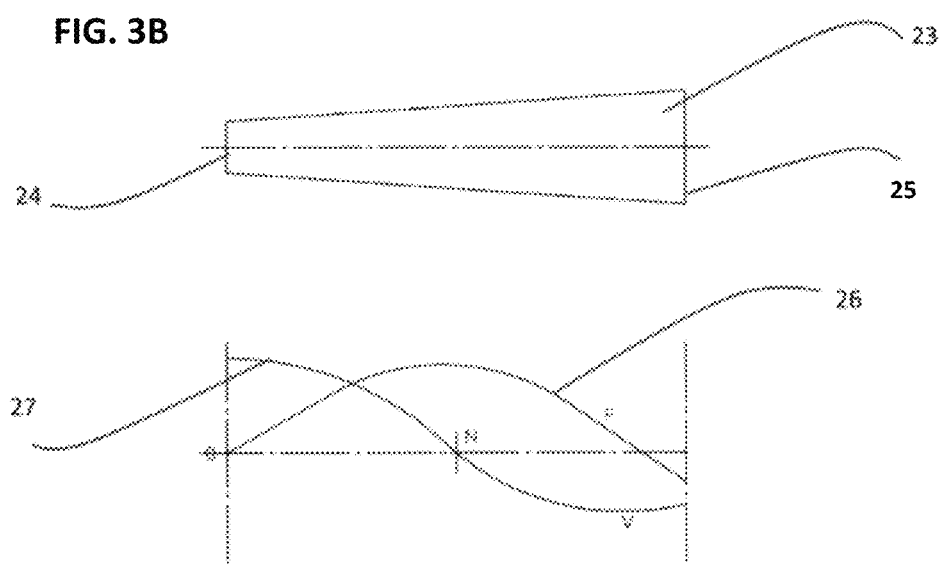
FIG. 3B is a side view of another tapered acoustic transformer including curves depicting the relationship between velocity and force along its length where the frequency of operation is greater than the frequency of resonance.

Referring to FIG. 3B, another tapered acoustic transformer 23, similar to transformer 18 of FIG. 3A, is shown wherein the force 26 on the acoustic transformer 23 is finite at the mesial end 25, for example, less than zero, and velocity 27 is a relative maxima at the distal end 24.

Figure 4:
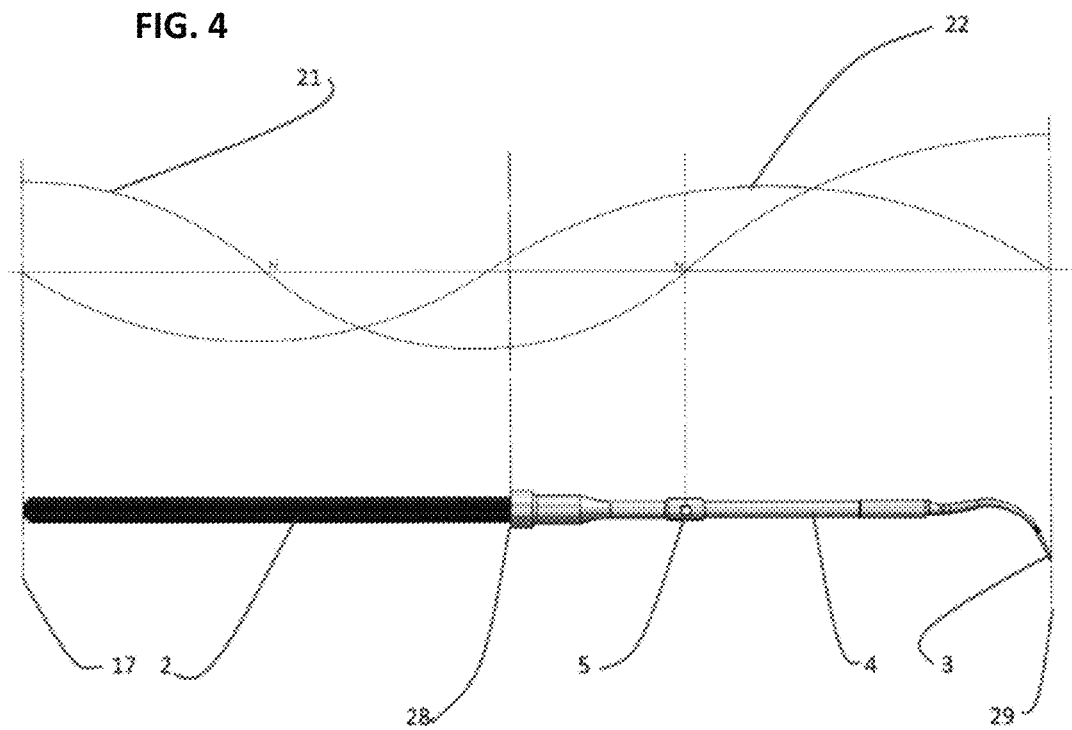
FIG. 4 is a side view of a one-half wavelength magnetostrictive stack coupled to a Connecting Body Tip Assembly (CBTA) which is greater than one-half wavelength of the resonant stack, as depicted by the accompanying curves.

Referring to FIG. 4, connecting body-tip assembly (CBTA) 4 and transducer 2 (also referred to as stack assembly 2) are shown attached at the mesial junction 28 of the combination, wherein force 22 is substantially zero at the distal end 29 of tip 3 and substantially zero at distal end of transducer 2, and has a finite value, for example greater than zero at the junction 28 of transducer 2 and CBTA 4. The velocity value crosses zero in the nodal area 5 on CBTA 4 and at the nodal area N (see FIG. 2) on transducer 2.

With continued reference to FIG. 4, the finite value of force 22 at the mesial junction 28 of the configuration depicts a frequency of the connecting body tip assembly 4 to be less than the resonant frequency of the transducer 2. In this configuration, the velocity 21 has relative maxima at the distal end 17 of the transducer 2 and the distal end 29 of the tip 3. These velocities approach their maxima as the tip or distal portion of the tip 3 wears (from the distal end 29) during clinical use and the frequency of the combination transducer 2 and connecting body tip assembly 4 approach resonance.

In some aspects, the present insert assembly includes a transducer defining a frequency of resonance; an acoustic transformer; and a tip coupled to a distal portion of the acoustic transformer, where a mesial portion of a combination of the acoustic transformer and the tip is coupled to the transducer, and wherein an operational frequency of the combination is not equal to the frequency of resonance of the transducer, e.g., wherein, at a full length of the tip, a force at a junction of the transducer and the acoustic transformer is finite, and wherein, at a reduced length due to an amount of wear of the tip, the force is substantially zero and an output stroke of the tip is substantially at a maximum.

In some aspects, for example, the operational frequency at the reduced length is coincident with the frequency of resonance. In additional or alternative aspects, the wear is greater than 1 mm and/or greater than 0 mm and less than 4 mm. In aspects, at the full length, the operational frequency of the combination of the acoustic transformer and tip is less than the frequency of resonance of the transducer. In aspects, the tip is press fitted onto the acoustic transformer, connected by threaded engagement, or is an integral part of the acoustic transformer. In aspects, at the full length, the operational frequency of the combination of the acoustic transformer and the tip is greater than the frequency of resonance of the transducer.

Figure 5:
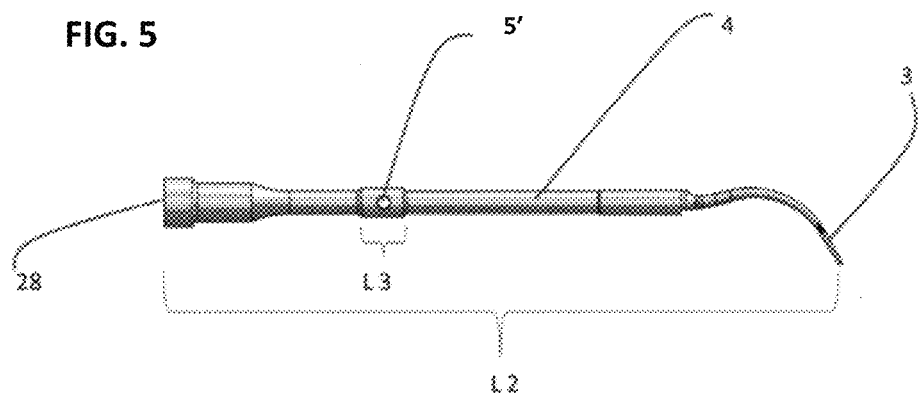
FIG. 5 is a side view of a CBTA wherein an acoustic transformer is coupled to a tip.

Referring to FIG. 5, insert tip 3 is shown wherein the mass of the insert tip 3 is increased by making it longer (e.g., defining a length L2, in combination with the length of acoustic transformer 4, that is greater than a length of insert tip 3 shown in FIG. 4, for example), wherein the operational frequency is lowered and force at the mesial end 28 is finite when operated in the configuration described above with respect to FIG. 4. In aspects, the operational frequency may be higher than the frequency of resonance. The connecting body tip assembly 4 may be configured to attach to form the insert assembly 1 (FIG. 1), as detailed above, via nodal pin 6 (FIG. 1) through a nodal port 5' located within the nodal area L3. Attachment to form other suitable insert assemblies are also contemplated. In some embodiments, L2 is greater than $$\frac{n\lambda}{4}$$

at resonance, wherein n can be 1 or 2.

Figures 6A, 6B:
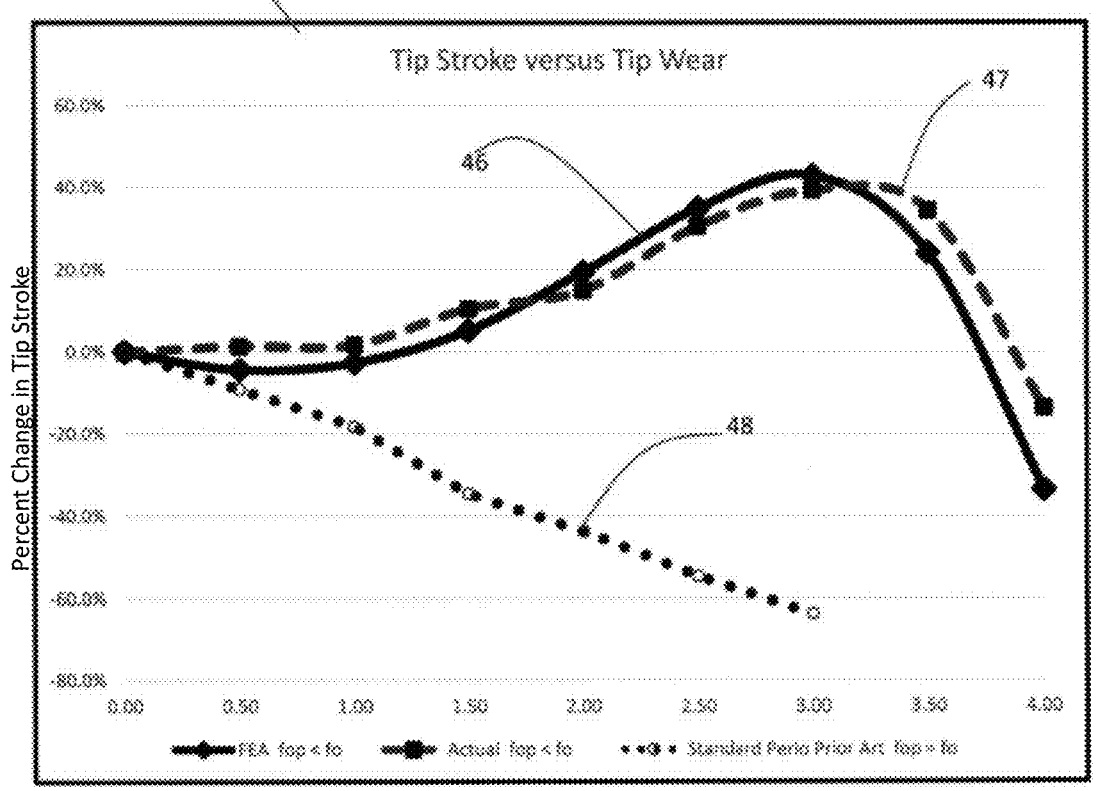
FIG. 6A is a chart showing the relationship between a prior art tool and a durable performance insert in accordance with the present disclosure with comparison to Finite Element Analysis of a durable performance insert of the present disclosure.
FIG. 6B is a graph showing percent change in Tip Stroke versus Tip Wear for the prior art tool and durable performance insert in accordance with the present disclosure.

With reference to FIG. 6A, the response of the output tip stroke for an ultrasonic dental insert configured in accordance with the present disclosure, and that of a prior art insert, are shown. The inserts and insert assemblies in accordance with the present disclosure provide a percent change in actual stroke 31 that initially increases over a first portion of tip wear 29 (e.g., from 0.0 mm to about 3.0 mm) and then decreases back towards the initial level over a second portion of tip wear 29 (e.g., for tip wear greater than 3.0 mm). The percent change in tip stroke versus tip wear for a prior art insert 32, wherein the response is monotonic, is contrasted with a Finite Element Analysis (FEA) 30 of an insert of the present disclosure shown in FIG. 1, which is nonmonotonic, and the actual results 31 of an insert of the present disclosure.

Referring to FIG. 6B, a graphical representation 34 of the data in FIG. 6A is shown. The plot of percent change in stroke for FEA 46 wherein the frequency of the acoustic transformer is less than the frequency of the transducer depicts essentially a nonmonotonic stroke change, e.g., change less than or equal to 10%, between 0 wear and 1.5 mm wear. The change in stroke increases between 1.5 mm wear and 3.0 mm wear, with a decrease after 3.0 mm wear. The change in stroke for a durable performance tip of the present disclosure, based on actual data, e.g., recorded on a microscope, shows a similar response 47.

Further reference to FIG. 6B illustrates a contrast between the stroke response of the inserts of the present disclosure and the actual stroke response for a prior art ultrasonic tool 48, wherein the prior art tool response 48 has a substantially monotonic decrease in stroke under the full range of tip wear (e.g., a percent change in stroke of −20% at approximately 1 mm wear).

In aspects, the insert assembly includes a transducer having a frequency of resonance and defining a length substantially equal to a frequency of resonance; wherein the length is defined by a $$\frac{n\lambda}{4}$$

section, where n=1 or 2, and an acoustic transformer; and a tip extending distally from the acoustic transformer, wherein a combination of the acoustic transformer and the tip is configured to operate at an operational frequency below the frequency of resonance, and wherein the combination defines a length greater than $$\frac{n\lambda}{4}$$

of the frequency of the transducer, where n=1 or 2, e.g., wherein the operational frequency of the combination approaches the frequency of resonance as a length of the tip is reduced from a full length.

In aspects, for example, the operational frequency is between 18 kHz and 50 kHz.

In aspects, the combination of the transducer, acoustic transformer and tip are configured to operate at an operational frequency below the frequency of resonance, e.g., wherein the combination has a non-monotonic stroke value that includes a maxima as the length of the tip is reduced, and wherein the operational frequency of the combination approaches the frequency of resonance as the length of the tip is reduced, such as wherein the operational frequency is between 18 kHz and 50 kHz, and the transducer is piezoelectric or magnetostrictive.

Figures 7A, 7B:
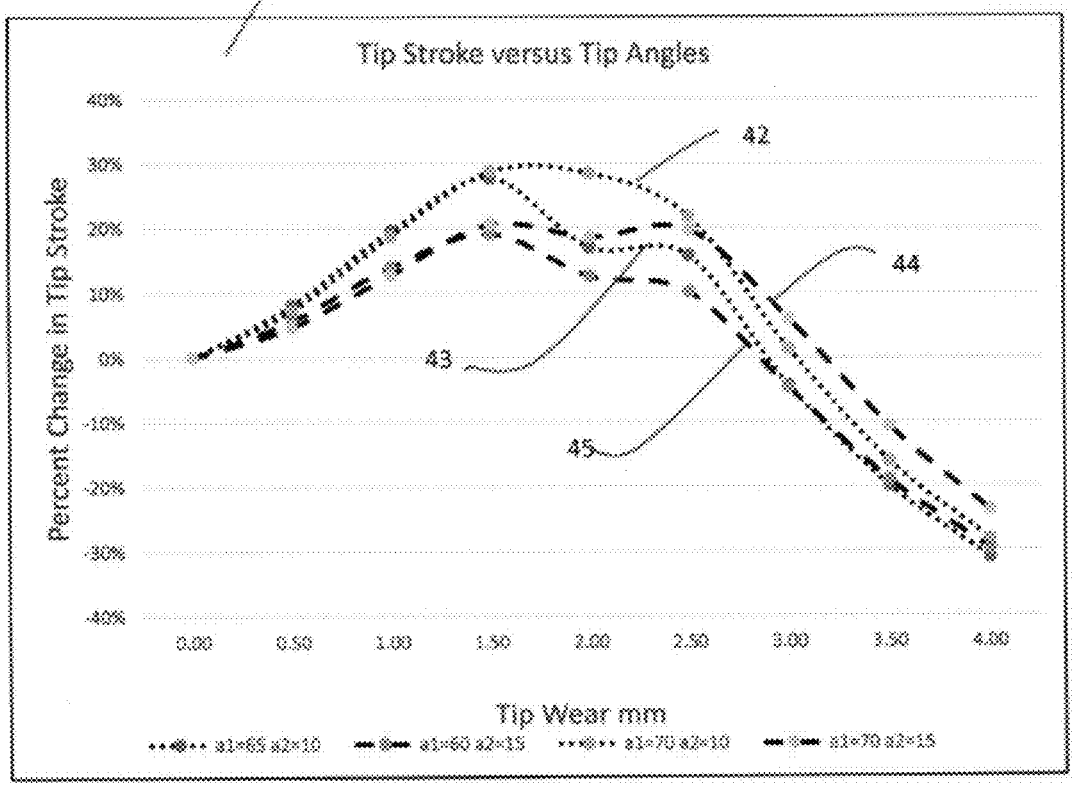
FIG. 7A is a chart showing the relationship between durability and tip angle parameters for various durable performance inserts in accordance with the present disclosure.
FIG. 7B is a graph showing percent change in Tip Stroke versus Tip Angles for the various durable performance inserts.

FIG. 7A shows a chart 35 of results for further aspects of inserts of the present disclosure wherein the combination of the contra bend and terminal bend angles are controlled, as is the ratio of the terminal angle to terminal tip length in the presence of finite forces at the mesial end of the acoustic transformer, to produce a non-monotonical output stroke (see FIG. 7B). More specifically, tip wear is provided in column 36 and indicated for each of a first column 37 that provides results where the terminal angle is 65 degrees and the contra angle is 10 degrees; a second column 38 that provides results where the terminal angle is 60 degrees and the contra angle is 15 degrees; a third column 39 that provides results where the terminal angle is 70 degrees and the contra angle is 10 degrees; and a fourth column 40 that provides results where the terminal angle is 70 degrees and the contra angle is 15 degrees.

With reference to FIG. 7B, a graph is shown depicting the relationship between terminal bend angles. Tip wear is shown over a range of 0 to 4.0 mm, wherein the percent change graphs 42, 43, 44, and 45, are plotted versus tip wear. The percent stroke change graphs 42, 43, 44, and 45 correspond to the configurations detailed above with respect to columns 39, 37, 40, and 38, respectively. As shown, changes in the contra angle with a constant terminal angle, e.g., as shown by comparison of graphs 42 and 44 and/or columns 39 and 40, provide a moderate increase in stroke range versus tip wear. A similar change in the terminal angle, e.g., as shown by comparison of graphs 43 and 45 and/or columns 37 and 37, has a greater effect on the stroke level than the stroke range.

Figure 8:
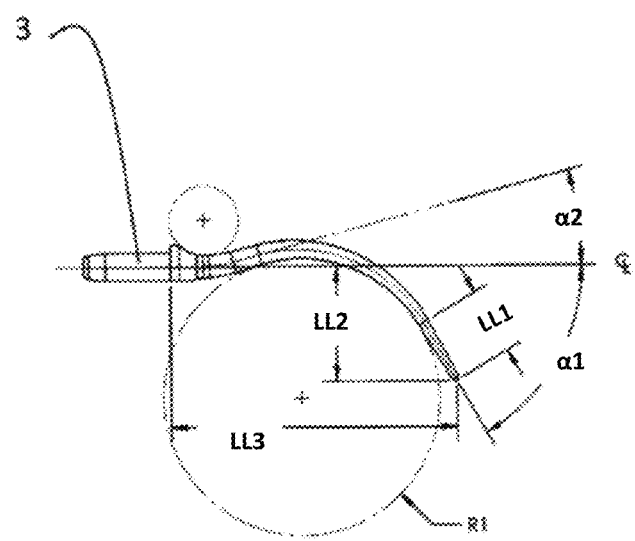
FIG. 8 is a side view of an insert tip illustrating including bend angles, radius of bend, and length parameters.

Referring to FIG. 8, the tip 3 is shown defining a geometry including a contra bend $\alpha 2$, a terminal bend $\alpha 1$, and a straight section LL1 located in the distal third of the tip 3. The point of the tip 3 is located a distance LL2 from the centerline CL, and a distance LL3 from a proximal end of the tip 3. The inside edge of the tip 3 is defined by radius R1. Analysis of the variation of $\alpha 1$ and $\alpha 2$ in combination are detailed herein with reference to FIGS. 7A and 7B.

In aspects, the insert assembly includes a transducer defining a length substantially equal to $$\frac{n\lambda}{4}$$

at a frequency of resonance thereof, where n=1 or n=2, and a combination of a tip and an acoustic transformer, wherein the combination is configured to operate at an operational frequency below the frequency of resonance, e.g., wherein the tip has a bend radius, wherein a ratio of a distance from a distal point of the tip to tangency with the bend radius is greater than 1.25, and wherein the tip defines two angles, wherein a ratio of a more-proximal of the two angles to a more-distal of the two angles is greater than 3.

In aspects, the ratio of the distance is greater than 1.25 and less than 2.25.

In aspects, the ratio of the more-proximal angle to the more-distal angle is such that an output stroke remains within 25% of an initial output stroke over a reduction in a length of the tip of at least 2.0 mm.

In aspects, the ratio of the distance is such that an output stroke remains within 25% of an initial output stroke over a reduction in a length of the tip of at least 3.0 mm.

In aspects, the ratio of the more-proximal angle to the more-distal angle is such that an output stroke remains within 25% of an initial output stroke over a reduction in a length of the tip of at least 2.0 mm.

In aspects, the ratio of the more-proximal angle to the more-distal angle is such that an output stroke remains within 25% of an initial output stroke over a reduction in a length of the tip of at least 3.0 mm.

In aspects, the ratio of the more-proximal angle to the more-distal angle in combination with the ratio of the distance are such that an output stroke remains within 25% of an initial output stroke over a reduction in a length of the tip of at least 2.0 mm.

In aspects, the ratio of the more-proximal angle to the more-distal angle in combination with the ratio of the distance LL1 are such that an output stroke remains within 25% of an initial output stroke over a reduction in a length of the tip of at least 3.0 mm.

Figure 9:
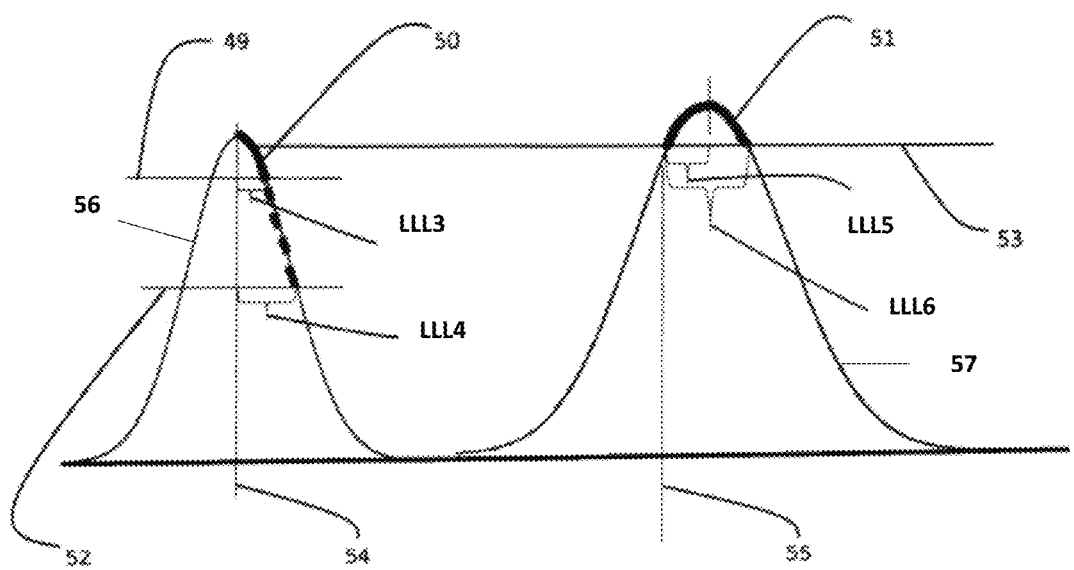
FIG. 9 is a simplified graphic illustration comparing the operational stroke parameter for a prior art insert and a durable performance insert of the present disclosure using a normal curve to describe the characteristic output stroke values as the tips wear.

With reference to FIG. 9, two normal curves 56 and 57 are shown, one for a prior art tip and the other for a tip in accordance with the present disclosure. The prior art curve 56 has a horizontal line 49 with length LLL3 representing 1 mm wear, and a second horizontal line 52 with LLL4 representing 2 mm wear. Vertical line 54 bisects curve 56 and shows a solid line segment 50 to the right of line 54. The intersection of solid line segment 50 with line 49 represents a point of approximately 25% reduction in output stroke. The dashed continuation of line segment 50 intersects line 52, which represents approximately 50% reduction in output stroke for the prior art insert. The stroke versus wear starts at the stroke maxima, for example, of the prior art insert and is located in its entirety to the right of line 54, wherein the output stroke decreases monotonically as the tip wears. This graphical representation shows that the prior art provides the current standard of care over approximately 1 mm of wear.

With continued reference to FIG. 9, normal curve 57 shows the output stroke versus wear characteristics for a durable ultrasonic insert in accordance with the present disclosure, e.g., as shown in FIGS. 1-5 and 8 and/or as described herein. Horizontal line 53 relates the two normal curves 56 and 57, showing a non-limiting example of crossing curve 56 at approximately 90% of its maximum value. Vertical line 55 intersects line 53 at the point of initial stroke value for an example durable ultrasonic insert of the present disclosure. Length LLL5 represents the distance from the intersection of lines 53 and 55 to the maximum value for curve 57. The solid line segment 51 represents the output stroke versus tip wear, whereas length LLL6 represents the loss of tip length where the output stroke is approximately equal to the initial value. Graph 57 points out the inherently different characteristics of the prior art inserts shown in graph 56 wherein the solid line segment 51 for the durable performance inserts of the present disclosure lies substantially on both sides of the maximum value showing a non-monotonic stroke as the tip wears. Graph 57 also demonstrates an advantage of an increased service life for the durable performance insert, in part, based on the ratio of LLL6:LLL3. In some embodiments, the LLL6:LLL3 ratio is greater than about 1, such as, for example, greater than about 1.5, greater than about 2, greater than about 3, or even greater than about 4.

Referring still to FIG. 9, the increased width of graph 57 compared to graph 56 is a result of the physical characteristics of the inserts and insert assemblies 1 (FIG. 1) of the present disclosure, e.g., as shown in FIGS. 1-5 and 8 and/or as described herein, as well as the gain of the combination of the transducer 2, acoustic transformer 4, and tip 3 (see FIGS. 4 and 8), as is detailed herein.

It should be understood that various aspects disclosed herein may be combined in different combinations than the combinations specifically presented in the description and accompanying drawings.

What is claimed is:

1. A dental ultrasonic insert assembly configured to produce a vibrational wave at an increasing output amplitude over a predetermined decrease in tip length, the dental ultrasonic insert assembly mounted in a handpiece activated by an ultrasonic system and comprising:
    a grip;
    a transducer defining a fixed length extending between the first and second ends, the transducer having a fixed transducer frequency of resonance f0 defined by the fixed length thereof;
    an acoustic transformer connected to the transducer at a junction and extending therefrom; and
    a tip connected to the acoustic transformer and extending therefrom such that the transducer, the acoustic transformer, and the tip define an acoustic system,
    wherein a combination of the tip and the acoustic transformer defines an initial combined length and has a first frequency of resonance f1 defined by the initial combined length that is substantially different than the fixed transducer frequency of resonance f0, and wherein the acoustic system is configured to produce a vibrational wave wherein a force component of the vibrational wave has a non-zero value at the junction,
    wherein, as a length of the combination decreases from the initial combined length towards a worn combined length that is less than the initial combined length as a result of wear of the tip:
        a frequency of resonance of the combination varies from the first frequency of resonance f1 towards a second frequency of resonance f2 that is defined by the worn combined length and is substantially equal to the fixed transducer frequency of resonance f0, and
        the force component of the vibrational wave produced by the acoustic system approaches a zero value at the junction.

2. The dental ultrasonic insert assembly according to claim 1, wherein the first frequency of resonance f1 is less than the fixed transducer frequency of resonance f0.

3. The dental ultrasonic insert assembly according to claim 1, wherein the first frequency of resonance f1 is greater than the fixed transducer frequency of resonance f0.

4. The dental ultrasonic insert assembly according to claim 1, wherein the tip is press fitted onto the acoustic transformer or an integral part of the acoustic transformer.

5. The dental ultrasonic insert assembly according to claim 1, wherein the transducer is piezoelectric.

6. The dental ultrasonic insert assembly according to claim 1, wherein the transducer is magnetostrictive.

7. The dental ultrasonic insert assembly according to claim 1, wherein the initial combined length and the worn combined length differ by up to and including 3 mm, and wherein a range of deflection at a distal end of the tip when the combination defines the worn combined length is within 20% of a range of deflection at the distal end of the tip when the combination defines the initial combined length.

8. The dental ultrasonic insert assembly according to claim 1, wherein the initial combined length and the worn combined length differ by up to and including 3 mm, and wherein a range of deflection at a distal end of the tip when the combination defines the worn combined length is within 10% of a range of deflection at the distal end of the tip when the combination defines the initial combined length.

9. The dental ultrasonic insert assembly according to claim 1, wherein the tip is screwed onto the acoustic transformer.

10. The dental ultrasonic insert assembly according to claim 1, wherein the predetermined decrease in tip length is between 1 mm and 3 mm.

11. A dental ultrasonic insert assembly configured to produce a vibrational wave at an increasing output amplitude over a predetermined decrease in tip length, the dental ultrasonic insert assembly mounted in a handpiece activated by an ultrasonic system and comprising:
    a transducer having a fixed transducer frequency of resonance f0 and defining a length substantially equal to one-half wavelength of the fixed transducer frequency of resonance f0;
    an acoustic transformer extending from the transducer; and
    a tip extending from the acoustic transformer,
    wherein a combination of the tip and the acoustic transformer defines an initial combined length greater than one-half wavelength of the fixed transducer frequency of resonance f0, and wherein the combination has a first frequency of resonance f1 defined by the initial combined length that is lower than the fixed transducer frequency of resonance, and wherein, as a length of the combination decreases from the initial combined length towards a worn combined length that is less than the initial combined length as a result of wear of the tip, a frequency of resonance of the combination varies from the first frequency of resonance f1 towards a second frequency of resonance f2 that is defined by the worn combined length and is substantially equal to the fixed transducer frequency of resonance f0.

12. The dental ultrasonic insert assembly according to claim 11, wherein the tip is press fitted onto the acoustic transformer.

13. The dental ultrasonic insert assembly according to claim 11, wherein the tip is an integral part of the acoustic transformer.

14. The dental ultrasonic insert assembly according to claim 11, wherein the transducer is piezoelectric.

15. The dental ultrasonic insert assembly according to claim 11, wherein the transducer is magnetostrictive.

16. The dental ultrasonic insert assembly according to claim 11, wherein the initial combined length and the worn combined length differ by up to and including 3 mm, and wherein a range of deflection at a distal end of the tip when the combined length defines the worn combined length is within 20% of a range of deflection at the distal end of the tip when the combined length defines the initial combined length.

17. The dental ultrasonic insert assembly according to claim 11, wherein the initial combined length and the worn combined length differ by up to and including 3 mm, and wherein a range of deflection at a distal end of the tip when the combined length defines the worn combined length is within 10% of a range of deflection at the distal end of the tip when the combined length defines the initial combined length.

18. The dental ultrasonic insert assembly according to claim 11, wherein the tip is screwed onto the acoustic transformer.

19. The dental ultrasonic insert assembly according to claim 11, wherein the predetermined decrease in tip length is between 1 mm and 3 mm.

20. A dental ultrasonic insert assembly configured to produce a vibrational wave at an increasing output amplitude over a predetermined decrease in tip length, the dental ultrasonic insert assembly mounted in a handpiece activated by an ultrasonic system and comprising:

a transducer having a fixed transducer frequency of resonance f0 and defining a length substantially equal to one-half wavelength of the fixed transducer frequency of resonance;

an acoustic transformer connected to and extending from the transducer; and a tip joined to and extending from the acoustic transformer, wherein a combination of the tip and the acoustic transformer defines an initial combined length greater than one-half wavelength of the fixed transducer frequency of resonance f0 and a first frequency of resonance f1 defined by the initial combined length that is below the fixed transducer frequency of resonance f0, wherein, as a length of the combination decreases from the initial combined length towards a worn combined length that is less than the initial combined length as a result of wear of the tip:

a frequency of resonance of the combination varies from the first frequency of resonance f1 towards a second frequency of resonance f2 that is defined by the worn combined length and is substantially equal to the fixed transducer frequency of resonance f0, and a velocity-amplitude at a distal end of the tip approaches a maxima.

21. The dental ultrasonic insert assembly according to claim 20, wherein the transducer is magnetostrictive.

22. The dental ultrasonic insert assembly according to claim 20, wherein the tip is press fitted onto the acoustic transformer.

23. The dental ultrasonic insert assembly according to claim 20, wherein the tip is an integral part of the acoustic transformer.

24. The dental ultrasonic insert assembly according to claim 20, wherein the initial combined length and the worn combined length differ by up to and including 3 mm, and wherein a range of deflection at a distal end of the tip when the combined length defines the worn combined length is within 20% of a range of deflection at the distal end of the tip when the combined length defines the initial combined length.

25. The dental ultrasonic insert assembly according to claim 20, wherein the initial combined length and the worn combined length differ by up to and including 3 mm, and wherein a range of deflection at a distal end of the tip when the combined length defines the worn combined length is within 10% of a range of deflection at the distal end of the tip when the combined length defines the initial combined length.

26. The dental ultrasonic insert assembly according to claim 20, wherein the tip is screwed onto the acoustic transformer.

27. The dental ultrasonic insert assembly according to claim 20, wherein the predetermined decrease in tip length is between 1 mm and 3 mm.

* * * * *